Dec. 22, 1936.  T. A. EDISON, JR  2,064,971
HEATING UNIT AND THE PRODUCTION THEREOF
Filed Jan. 13, 1932  3 Sheets-Sheet 1
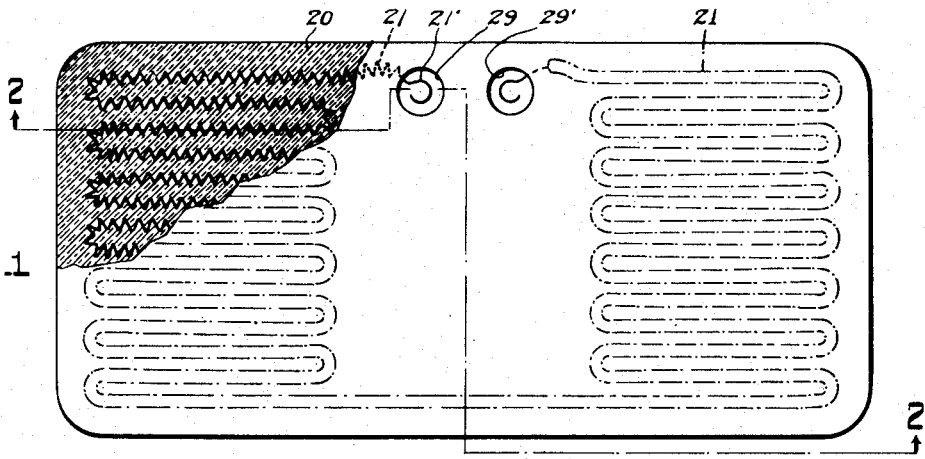
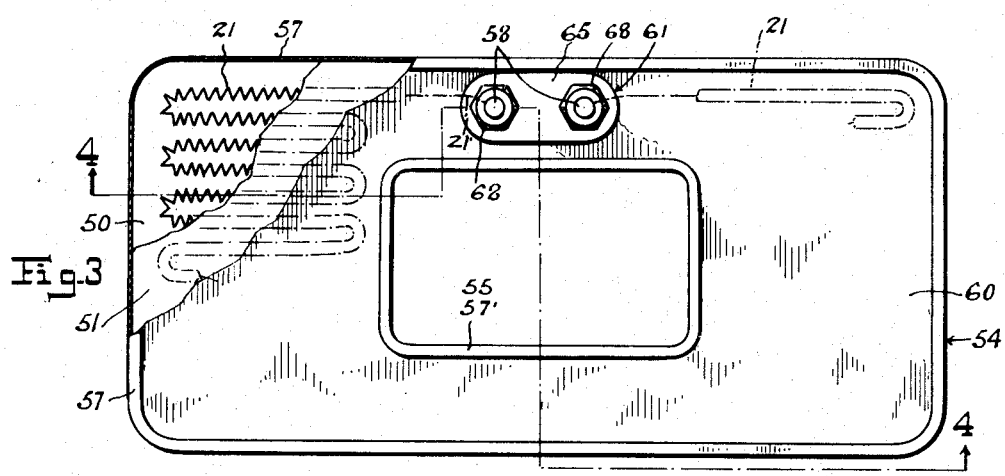
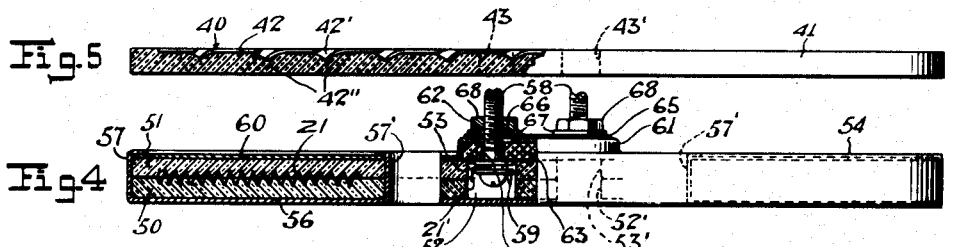
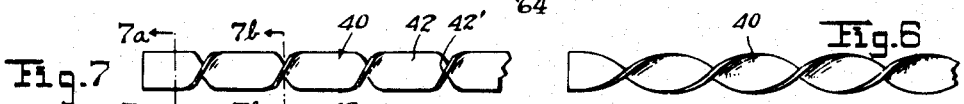
INVENTOR
Thomas A. Edison Jr.
BY Henry Lanahan
ATTORNEY Dec. 22, 1936.　　　　T. A. EDISON, JR　　　2,064,971
HEATING UNIT AND THE PRODUCTION THEREOF
Filed Jan. 13, 1932　　　3 Sheets-Sheet 2
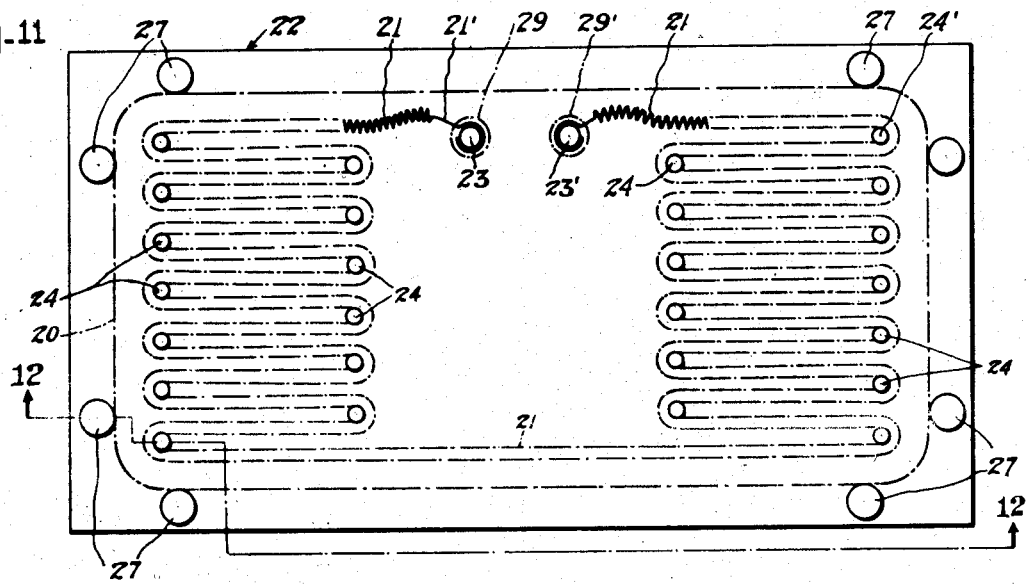
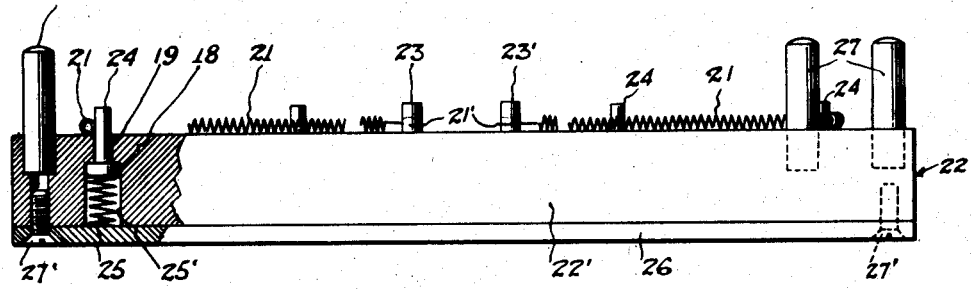
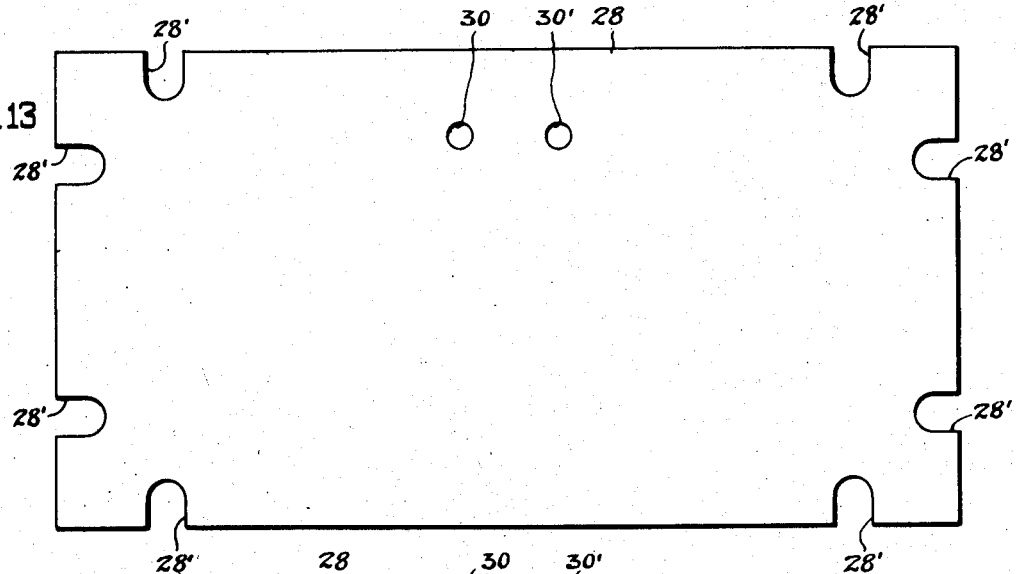
INVENTOR
Thomas A. Edison Jr.
BY Henry Lanahan
ATTORNEY

Dec. 22, 1936.  T. A. EDISON, JR  2,064,971
HEATING UNIT AND THE PRODUCTION THEREOF
Filed Jan, 13, 1932  3 Sheets-Sheet 3

INVENTOR
Thomas A. Edison Jr.
BY Henry Lanahan
ATTORNEY

Patented Dec. 22, 1936

2,064,971

UNITED STATES PATENT OFFICE 2,064,971

HEATING UNIT AND THE PRODUCTION THEREOF

Thomas A. Edison, Jr., Orange, N. J., assignor to Thomas A. Edison, Incorporated, West Orange, N. J., a corporation of New Jersey Application January 13, 1932, Serial No. 586,335

15 Claims. (Cl. 201—64)

The present invention relates to heating units and the production thereof and, more particularly, to electric heating units adapted to be used in electrical appliances and apparatus and the method of and apparatus for producing the same.

Heating units of the character just referred to may be broadly divided into two types, to wit: those in which the heating elements are exposed for direct radiation of heat to the articles to be heated, and those in which the heating elements are concealed in insulating material so that the heat from the elements is indirectly transmitted to the articles to be heated.

Heretofore heating units of the indirect type have been produced by surrounding the heating element or elements with plastic refractory insulating material and then baking the same until the plastic material became hard or vitrified and unyielding. Heating units of the direct type have heretofore been produced by threading or weaving the heating element or elements on thin supports of insulating material, such as mica, for example. Either type of heating unit produced as above briefly described, is quite expensive, and heating units of the indirect type as now made are open to the further objection that the plastic refractory material on baking becomes very hard and unyielding, so that the heating elements embedded therein are, on repeated expansion and contraction due to temperature changes, subject to wear and deterioration because of the abrasive action of the non-yielding refractory material thereon. The life of such units is accordingly materially shortened. Heating units of the direct type as now made, are also open to the objection that the heating elements are likely to become warped or distorted by the heat and are subject to oxidation and deterioration at the points of support or threading.

The present invention aims to obviate these and other objectionable features present in heating units as now produced and used. Explained briefly in accordance with my invention, a direct heating unit comprises a suitably formed heating element which is impinged or impressed into a suitable sheet of slightly yieldable insulating material, while an indirect heating unit comprises a suitably formed heating element impinged or impressed into and between a plurality of suitable sheets of slightly yieldable insulating material.

An object of my invention is to provide improved and comparatively inexpensive heating units in which the heating elements will be protected against substantial deterioration and warpage due to heat, as well as against wear and deterioration from other causes, thus tending to prolong the life of the heating units.

Another object of my invention is to provide improved apparatus for the efficient and inexpensive production of heating units of the construction herein described or of similar construction.

A further object of my invention is to provide an improved method for the effective and economical production of heating units.

Other objects of my invention will be obvious upon an understanding of the illustrated embodiment about to be described, or will be indicated in the appended claims, and various advantages not specifically referred to herein, will occur to one skilled in the art upon employment of my invention in practice.

In order that my invention may be more clearly understood, preferred embodiments have been chosen for purposes of illustration and description, and are shown in the accompanying drawings, wherein:

Figure 1 is a plan view partly in section, of a direct heating unit provided with a helical coil heating element, according to my invention;

Fig. 2 is a sectional view of the same, taken on line 2—2 of Figure 1;

Fig. 3 is a plan view partly broken away, of an indirect heating unit shown encased in armor;

Fig. 4 is a sectional view taken on line 4—4 of Fig. 3;

Fig. 5 is a part sectional view of a heating unit provided with a twisted and distorted ribbon heating element, according to my invention;

Fig. 6 is an enlarged fragmental view of a twisted ribbon heating element designed for use in certain forms of my heating units;

Fig. 7 is an enlarged bottom plan view of the ribbon shown in Fig. 6, illustrating its form after application to a direct type heating unit;

Fig. 7a is a sectional view on line 7a—7a of Fig. 7;

Fig. 7b is a sectional view on line 7b—7b of Fig. 7;

Fig. 8 is an enlarged fragmental elevation of a helical coil heating element which may be employed;

Fig. 9 is an enlarged end view of the helical coil heating element shown in Fig. 8;

Fig. 10 is an enlarged end view of the twisted ribbon heating element shown in Fig. 6;

Fig. 11 is a plan view of the base member of a jig designed to be used in the production of my improved heating units, showing a heating element positioned thereon, with an insulation sheet shown in dash and dot lines;

Fig. 12 is a section on line 12—12 of Fig. 11;

Fig. 13 is a plan view of a top plate which is designed to be used in conjunction with the apparatus shown in Fig. 11;

Fig. 14 is a side elevation of the top plate shown in Fig. 13;

Fig. 15 is an enlarged sectional view showing a fragment of a multiple sheet indirect heating unit employing a twisted ribbon heating element;

Figure 16:
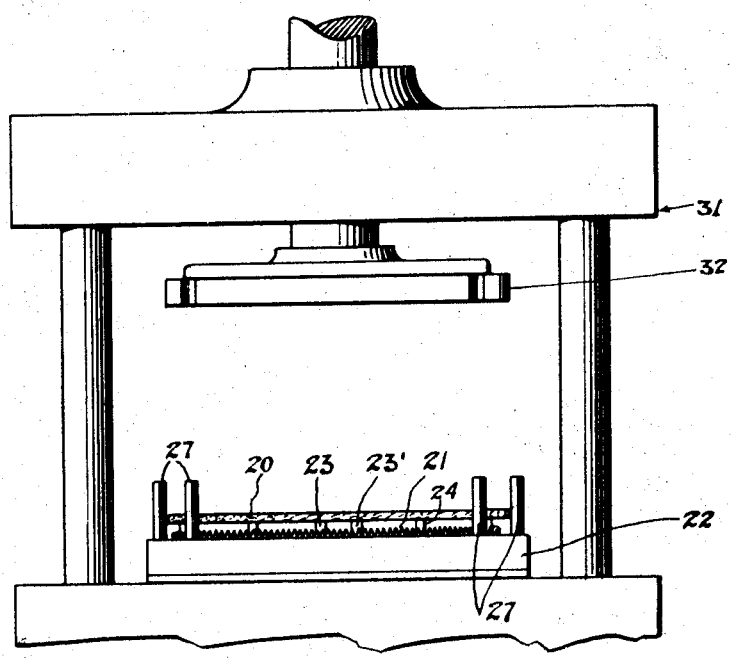
Fig. 16 is a fragmentary view of a press showing one form of my improved heating units in process of production.

Upon a complete understanding of the preferred embodiments about to be described, it will be obvious to those skilled in the art that my invention is capable of being applied to many forms of heating units other than those herein specifically described. The preferred embodiments illustrate several classes of heating units which will be hereinafter described in the following order:

Class one heating unit comprises a single sheet of insulating material, which may or may not be formed of laminations, and a heating element such as a helical coil impressed therein.

Class two heating unit is similar to class one, except that a twisted and distorted ribbon heating element is employed.

Class three heating unit comprises either a plurality of sheets of insulating material with a heating element, such as a helical coil or a twisted ribbon, for example, disposed between the insulating sheets, or a single sheet of insulating material formed of a plurality of laminations with a heating element disposed between the laminations.

The term "sheet" as used in this specification and the appended claims means any mass of electrical insulating material capable of maintaining its integrity of form without extraneous support.

Referring to the accompanying drawings, 20 represents a specially prepared sheet of insulating material which may be of any suitable shape and which, if desired, may be formed of a plurality of thinner sheets or laminations. The sheet 20 is preferably composed of 70% magnesium oxide and 30% asbestos fiber by weight. In producing the sheets shown in my preferred embodiments, I may employ what is known to those skilled in the art as "light magnesium oxide" as distinguished from "heavy magnesium oxide." The former is produced by calcining at a temperature which is relatively low as compared to that at which heavy magnesium oxide is calcined, and is characterized by a certain quality of fluffiness which renders it more capable of being mixed with a binder, such as asbestos fiber, to effectively produce a homogeneous sheet of slightly yielding and substantially non-abrasive insulating material having the desired qualities. Heavy magnesium oxide might be used, however. These materials may be formed into a slightly yieldable sheet in any suitable manner, but I preferably proceed as follows: 360 grams of asbestos fiber are placed in a suitable beater with 30 liters of water and the fiber is reduced to a suitable length such as for example 2.5 millimeters, after which 850 grams of finely powdered magnesium oxide are added to and thoroughly mixed with the beaten material. The resulting mixture is then discharged from the beater into a suitable vessel and sufficient water is added and mixed to bring the volume of the mixture up to approximately 150 liters. The mixture is then removed from the vessel and applied to suitable molds to form sheets of desired thickness, the surplus water being allowed to drain or filter out. The wet sheets are then placed on absorbent pads and slightly compressed (five and one-half pounds pressure per square inch is sufficient) for further removal of water. The sheets are then dehydrated in a drying oven at a temperature of about 150° F. until substantially all of the water is removed. Some variation may be made in the proportions of asbestos and magnesium oxide used, and other ingredients might be added without seriously affecting the desired qualities of the sheet produced. Fair but not the best results may be obtained by using sheets respectively composed of from 60% to 80% magnesium oxide and from 40% to 20% asbestos fiber by weight. If the proportion of magnesium oxide is substantially greater than 80%, there is a marked tendency for the sheet to crumble and disintegrate. If the proportion of asbestos fiber is substantially greater than 40% the electrical insulating qualities of the sheet are likely to be reduced below the desired limit. In any event, the insulating sheet 20 should be of such a character as to prevent short circuiting and to be slightly yieldable and substantially non-abrasive, and should also maintain the integrity of its original form without crumbling and without excessive warping under heating. Such sheet should also not be highly hygroscopic, i. e., it should not readily absorb aqueous vapors. I have found that insulating sheets made of 70% magnesium oxide and 30% asbestos, in the manner above described, possess the desired qualities and are most suitable for use in my improved heating units. A plurality of such sheets may also be readily formed under high pressure into a single laminated sheet.

In making a class one heating unit, I preferably proceed as follows: A suitable heating element, preferably in the form of a helical coil 21 and preferably of round "nichrome" resistance wire (see Fig. 8), is disposed on the jig 22, as shown in Fig. 11. If desired, the wire may be serrated or roughened in any suitable manner to increase the gripping or clinching qualities thereof, although this may slightly increase the cost of production and may also tend to slightly decrease the life and efficiency of the heating element. The helical coil 21 is preferably about one-eighth of an inch in outside diameter, and the wire used in the coil should be of such strength that the coil will not collapse upon application to the sheet 20 of pressure as hereinafter described. The adjacent whorls or convolutions 23 of the coil 21 are preferably slightly spaced for a purpose which will presently appear. In applying the coil to the jig, one end portion of the wire comprising the coil 21, is straightened out, as at 21', and wound around the post 23 of the jig, the coil 21 then being passed back and forth and around between a sequence of pins or arbors 24 and 24' to dispose the coil in the desired pattern on the jig. It will be understood that the disposition of the coil 21 depends on the positioning of pins 24 and 24', and that the disposition of the coil shown is merely illustrative of one pattern. Any suitable and desired pattern may be used. After passing the coil around the pin 24' (the final pin in the sequence) the coil is extended to the post 23' and the short piece of the wire in that end of the coil is straightened out and wound around the latter post. The coil 21 will then extend, preferably under a slight tension, from post 23 and around posts 24 and 24' to post 23'.

Each of the pins 24 and 24' is provided with an enlarged lower head 18 and is supported by a spring 25 in an opening or recess 25' formed in the base member 22' of the jig, and normally the reduced upper end portion of the pin extends through an upper reduced portion 19 of the opening 25' and above the plane upper surface of the base member 22', which is preferably a suitably sized and shaped block of metal, such as steel. A bottom plate 26 is secured to the jig base member 22' as by screws 27', and serves to support the springs 25 and pins 24 and 24' in assembled position, as shown in Fig. 12, and so that the pins 24 and 24' may be depressed upon the application of slight pressure. The posts 23 and 23' are preferably mounted and supported in a manner similar to pins 24 and 24', and so that they also may be depressed by the application of a slight pressure. The base member 22' is also provided with preferably non-depressible posts 27 for positioning the removable jig top plate 28, which is provided with notches 28' adapted to be registered with and to cooperate with the posts 27.

After disposing the coil 21 in the selected pattern on the jig, an insulating sheet 20, which should be slightly thicker than the outer diameter of the coil and which may, if desired, be formed of a plurality of thinner sheets laminated in a well known manner, is positioned on the jig with its peripheral edges fitting within the posts 27 and its lower surface resting on the upper ends of pins 24 and 24'. The sheet 20 has two openings 29 and 29' which are slightly larger in diameter than, and which respectively register with the posts 23 and 23' when the sheet is positioned as described. The top plate 28, which is preferably made of some strong metal and which may be from three-eighths of an inch to one inch thick, is now positioned over the sheet 20 with the notches 28' therein respectively engaged by the posts 27 of the jig. The top plate 28 is preferably provided with two openings 30 and 30' which are slightly larger in diameter than the posts 23 and 23' and in which the latter are adapted to extend. If the said posts 23 and 23' are not resiliently supported and depressible as described above, they should be of such length as to extend into but not entirely through the openings 30 and 30' when the top plate is positioned, so that upon depression of the pins 24 and 24' flush with the top of the jig base member 22' and of the sheet 20 into engagement with said member, said posts will not extend above the upper surface of the top plate 28. The reason for this will presently be apparent.

The jig assembly comprising the jig 22 with the coil 21 disposed thereon and with the sheet 20 and the top plate 28 positioned as just described, is now placed in a suitable press, such as 31 for example, having a plunger head 32 adapted upon operation of the press, to apply an evenly distributed pressure to the top plate 28. The press is then operated to so apply a pressure of approximately 125 pounds per square inch, whereupon each whorl 33 of the coil 21 will be impressed into, but not through, the yielding and comparatively thick insulating sheet 20. The yieldable sheet 20 will now be impinged on the coil 21 and the latter will be substantially embedded in but flush with the under surface of the sheet. The coil 21 will not be flattened or distorted to any appreciable degree and will retain its helical configuration. Each of the spaced whorls 33 will be securely gripped by the compressed but slightly yielding portion of the sheet 20 adjacent thereto, and the sheet 20 will not be distorted or warped as the pressure exerted thereon in the operation of the press is evenly distributed thereover. The jig assembly is then removed from the press and the heating unit, after removal of the top plate 28, is lifted from the jig and the ends of the coil 21 are slipped off the posts 23 and 23'. The two ends of the heating element 21 which were coiled around the posts 23 and 23' are left exposed in the openings 29 and 29' respectively, for connection to suitable terminals. It is to be noted that while the coil 21 is substantially embedded in the slightly yielding and substantially non-abrasive sheet 20, it will not be subject to wear and deterioration such as would be caused by the action of hard and abrasive insulation material on radical and repeated temperature changes. Also while the portions of the coil 21 which are contiguous the base member 22' of the jig, will be exposed at one surface of the sheet 20, they will be flush with said surface and the coil will therefore be protected against injury from external sources. If desired, the peripheral surfaces or edges of the sheet 20 may be provided with a protective frame or binding (not shown).

The class one heating unit just described is a high quality product which will furnish direct radiation of heat from the exposed portions of the impressed coil 21, as well as from the sheet 20 adjacent the coil. Repeated and radical temperature changes do not materially affect the intimate relationship of the coil with the sheet 20. However, in producing the class one heating unit, a comparatively thick sheet of insulating material is desirable, and if economy is a factor of prime importance, it may be preferable to employ one of the class two heating units about to be described.

In producing a class two heating unit, a heating element made of "nichrome" resistance wire in the form of a ribbon 40 may be advantageously employed. I prefer to use a ribbon which is twisted so as to have approximately eight turns or whorls to the lineal inch. The ribbon 40, twisted as shown in Fig. 6, is disposed on the jig 22 in the desired pattern in the same manner as explained above in respect to the helical coil 21 of my class one heating unit, and with the two ends of the ribbon wound about the posts 23 and 23'. A suitable insulating sheet 41, preferably formed of the same proportions of asbestos fiber and magnesium oxide as hereinbefore described in respect to the sheet 20, but which may, is desired, be considerably thinner than the latter, is then positioned on the jig and pressure is applied to the assembly in the same amount and manner as in the case of my class one heating unit. The application of the pressure forces the lower portion of the twists in ribbon 40 against the comparatively hard plane surface of the steel base member 22' of the jig and distorts and flattens the twists of the ribbon against the latter. By reason of this distorting and flattening action the hitherto symmetrical form of the twisted ribbon 40 is changed so that each twist or whorl of the ribbon comprises two portions or sections 42 and 42' of dissimilar shape in cross section (see Figs. 7a and 7b). A roughened portion or impinging hook 42" is formed on each section 42' of the ribbon, and in the pressing operation the hooks 42" are forced into and clinch or grasp the comparatively soft, yielding and non-abrasive insulating sheet 41. (See Fig. 5.) When the pressure is released, the longer flattened portions 42 of the twisted ribbon are impressed into the insulating sheet 41 and are flush with one surface thereof. The heating ribbon will be tenaciously held to the sheet 41 in this position by virtue of the grasping, clinching or clamping action of the hooks 42". Suitable openings 43 and 43' provided in the sheet 41 so as to register with the posts 23 and 23' when the sheet is positioned in the jig, render accessible the two ends of the twisted ribbon heating element 40 upon removal of the heating unit from the jig, in the same manner as above described in respect to the class one heating unit. If desired, the peripheral surfaces or edges of the sheet 41 may be enclosed in any known manner with a suitable protecting frame or binding (not shown).

The class two heating unit just described, in addition to having all the advantages of the class one heating unit, is more economical to produce and also has more of the heating element surface area exposed whereby there will be a more rapid and direct radiation of heat from said element. The twisted and distorted ribbon 40 will remain clamped to and in intimate relationship with the sheet 41 under repeated and radical temperature changes. The class two heating unit is particularly adapted for use in toasters and similar household electrical appliances where rapid direct radiation of heat is desired.

Figure 17:
Fig. 17 is a fragmentary sectional view showing a heating element partly impressed in one sheet of the unit shown in Fig. 4.
Figure 18:
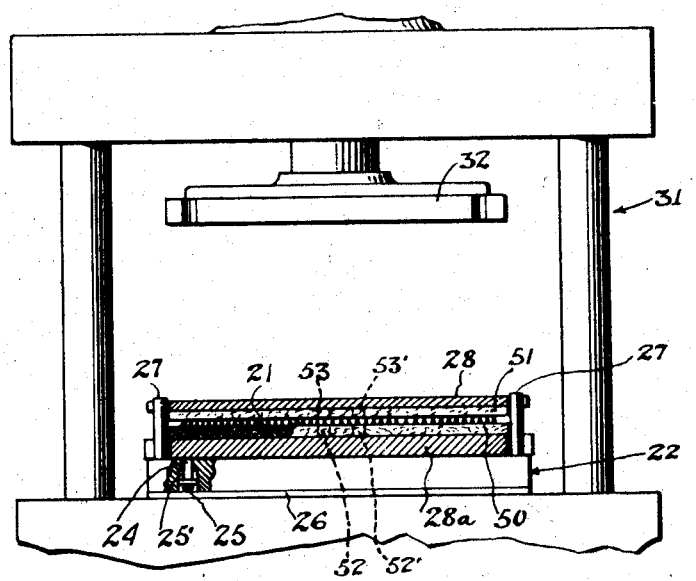
Fig. 18 is another fragmentary view of the press illustrated in Fig. 16 showing a multiple sheet heating unit in production.
Figure 19:
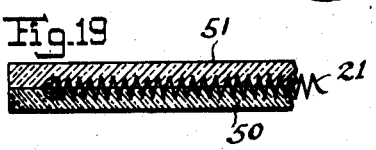
Fig. 19 is a sectional view of a fragment of a multiple sheet heating unit.

It is sometimes desirable in certain classes of electrical apparatus, to employ a form of heating unit wherein the heating element is completely embedded and concealed in insulating material instead of being partly exposed. Such a heating unit (i. e. a class three heating unit) is preferably made by first disposing on the base member 22 of the jig in the same manner as hereinbefore described in respect to the class one heating unit a helical coil 21 preferably formed of the round "nichrome" resistance wire heretofore referred to, then positioning a sheet 50 (which is formed of the same proportions of asbestos fiber and magnesium oxide as the sheet 20, but which may, as desired, be made either thicker or slightly thinner) on the jig and then positioning the top plate 28, all as described above in respect to the class one heating unit. The sheet 50 is provided with terminal openings 52 and 52' (see Figs. 4 and 18) adapted to register with posts 23 and 23' respectively of the jig. The jig assembly is now placed in the press 31 and pressure is applied, as hereinbefore described in respect to the class one heating unit. The jig in this case is preferably provided with a suitable stop (not shown) for limiting the downward stroke of the plunger head 32 so that the coil 21 will not be fully impressed into the sheet 50. All that is desired is to have the coil 21 slightly impressed into the sheet so that the coil will adhere thereto when the sheet is removed from the jig. (See Fig. 17.) I preferably impress the coil into the sheet 50 a distance equal to one-third to one-half of the outer diameter of the coil. The sheet 50 with the coil 21 adhering to it, is removed from the jig 22 as hereinbefore explained in respect to the class one heating unit, and inverted so that the surface of the sheet in which the coil 21 is now slightly impressed is uppermost. The inverted sheet is then positioned on a flat pressure plate 28a, similar to top plate 28, for example (see Fig. 18), and placed in the jig. Or, if desired, instead of placing the sheet in the jig 22, the sheet with the coil uppermost, may be positioned on any other suitable unyielding plane surfaced pressure plate or member. A second insulating sheet 51, preferably similar in all respects to sheet 50 and provided with openings 53 and 53', is placed above the sheet 50 with the said openings respectively registering with the terminal openings 52 and 52' of the latter sheet and with the bottom thereof engaging the upper portion of the coil 21. The assembly including the two sheets 50 and 51 positioned as described, is now placed in the press 31, a suitable pressure plate such as 28 for example, is positioned on top of sheet 51, and the press is then operated to apply a comparatively high and evenly distributed pressure (1500 pounds per square inch is sufficient), after which the assembly is removed from the press and the unit, consisting of the pressed together sheets 50 and 51 and the coil 21 impressed and embedded in such sheets, is removed from between the plates 28 and 28a.

It will be noted that parts of the coil 21 are impressed in each of the slightly yieldable and non-abrasive sheets 50 and 51 so that each of the spaced convolutions or whorls of the coil is impressed in and is grasped by each of the sheets in a manner similar to that in which the sheet 20 grasps the convolutions of the coil 21, as explained above, in the class one heating unit. The high pressure applied does not appreciably affect the form of the coil or the sheets, and the sheets 50 and 51 are forced by this pressure into such intimate relationship as to form one laminated sheet. The coil 21 is wholly embedded in and concealed by this laminated sheet, except that the two ends of the coil are exposed in the openings 52 and 53, and 52' and 53'. Radical and repeated temperature changes will not injure the coil 21 or sheets nor affect their intimate relationship. Upon energizing the heating coil 21 the heat produced will be absorbed by the insulating sheets 50 and 51 and will be radiated or transmitted therefrom. The sheets will store a considerable quantity of heat from the coil and will therefore transmit heat for some time after the coils have been de-energized. This is a desirable feature in certain types of electrical apparatus, such as sandwich grills and waffle bakers, for example. The device produced as described above and consisting of the pressed together sheets 50 and 51 and the coil 21 impressed and embedded therein, constitutes a finished heating unit, which, if desired, may be encased in a protective armor, as will presently be explained.

A class three heating unit may also be made by impressing a twisted ribbon heating element 44 (similar in all respects to the ribbon element 40 hereinbefore described in respect of the class two heating unit) into and between two sheets of yieldable and non-abrasive insulating material such as the sheets 45 and 46 shown in Fig. 15. The sheets 45 and 46 are similar in all respect to the sheet 20 hereinbefore described in respect of the class one heating unit, except that sheet 46 is preferably provided with a plurality of openings 47 which are so positioned as to respectively register with the depressible pins 24 and 24' carried by the base member 22' of the jig 22, when this sheet is properly positioned on the jig.

According to my invention the sheet 46 is preferably first positioned on the base member 22' of jig 22 with the pins 24 and 24' respectively extending through the holes or openings 47 in the sheet and projecting somewhat above the upper surface of the latter. It will be understood that both of the sheets 45 and 46 are provided with suitable openings (not shown) which are respectively adapted to register with the posts 23 and 23' of the jig, and which correspond to the openings 29 and 29' in the sheet 20. The twisted ribbon heating element 44 is now disposed on the jig around and between the upper projecting end portions of the pins 24 and 24' with the two ends of the ribbon respectively wound about the posts 23 and 23'. The sheet 45 is then positioned in the jig 22 with its bottom surface engaging the upper ends of the depressible pins 24, 24', and the plate 28, or another suitable pressure plate, is disposed on top of sheet 45. This assembly, comprising the jig, the sheets 45 and 46, the heating element 44 and the pressure plate 28, all positioned as described, is now placed in the press 31 and the latter is operated to apply a comparatively high pressure (preferably about 1500 pounds to the square inch).

The twisted ribbon heating element 44 is not noticeably distorted by the application of this comparatively high pressure, but is impressed into and between the sheets 45 and 46 and the edge portions 48 of its warped or twisted surfaces 48 are forced into clinching or gripping engagement with both of the sheets. The sheets and the heating element 44 are securely held together in the positions shown in Fig. 15, by reason of such clinching or gripping engagement and also by reason of the adhesion between the two contiguous surface portions of the sheets which results from the high pressure applied. The heating unit thus produced, which is now removed from the press and the jig, comprises a single laminated sheet (formed of the two sheets 45 and 46) with the heating element 44 embedded and concealed therein and with only the ends of said heating element exposed in the two openings, which were engaged by the posts 23, 23' of the jig, for connection with suitable leads or binding posts (not shown) included in an electric circuit.

The intimate adhesive relationship between the two sheets 45 and 46, and the gripping engagement of the heating element 44 therewith are not materially affected by radical and frequent temperature changes, and because of the slightly yieldable and substantially non-abrasive qualities of the sheets 45 and 46, the element 44 is not subject to substantial deterioration or wear in the use of the heating unit for extended periods. This heating unit also possesses all the advantages of the class three heating unit hereinbefore described, and in addition is somewhat more economical to produce.

It may be desirable for certain usages to encase my improved indirect heating unit in armor such as 54 (see Figs. 3 and 4). This can be accomplished in various ways, but I preferably proceed as follows: One of my indirect heating units, such, for example, as that above described and comprising the yieldable insulating sheets 50 and 51 and the heating element 21, is preferably provided with a centrally positioned and substantially rectangular opening 55 extending through both of said sheets. This opening 55 should not be of such size or shape as to expose any part of the heating element 21. The heating unit is then placed on a bottom plate 56, preferably formed of suitable fairly thin sheet metal, such as steel, and having an opening which is similar to and is adapted to register with the opening 55. The bottom plate 56 is provided with upstanding flanges 57 and 57' which conform to and respectively closely engage the exterior and interior peripheral surfaces or edges of the heating unit and which extend slightly above the upper surface of the latter. Suitable screws 58 are disposed in the openings 52, 53 and 52', 53' of sheets 51 and 50, the heads of said screws being located within said openings and the threaded portions or shanks thereof extending from said openings and above the upper surface of the unit, as clearly shown in Fig. 4. Preferably two washers, such as 59, are positioned on each of said screws adjacent to the heads thereof and each of the ends 21' of the heating element 21 is wound around one of the screws 58 between the two washers 59 thereon. It will be obvious that, if desired, the head of each screw 58 may be slightly enlarged so as to serve the same purpose as one of the washers 59, in which event each end of the element 21 would be disposed around one screw 58 between the enlarged screw head and a single washer 59. A top plate 60 formed of thin sheet metal has an opening which is similar to and is adapted to register with the opening 55 in the heating unit, and is also provided with an out-struck portion 61 the upper wall or side of which has two spaced openings 62 of considerably greater diameter than the screws 58. The shanks of screws 58 are adapted to extend through the openings 62 without touching the edges thereof, when the top plate 60 is positioned as will presently be described. A block of insulating material 63, preferably formed of porcelain, is fitted snugly within the said out-struck portion 61 of plate 60 and is of such a thickness that the bottom thereof is substantially flush with the bottom of the main portion of said plate. The insulator 63 has two spaced openings 64 which are of substantially the same diameter as the shanks of screws 58 and which are respectively concentric with the larger openings 62 in the plate 60 when the insulator 63 is properly positioned, as shown in Fig. 4. The plate 60 is positioned with its outer edges and the edges of the central rectangular opening therein respectively abutting the upstanding flanges 57 and 57' of bottom plate 56 and with each of the screws 58 extending through one pair of the registering openings 62, 64 in the plate 60 and block 63. A sheet of suitable insulating material 65, such as mica, which is of substantially the same peripheral configuration as the top surface of the out-struck portion 61 of plate 60, has two spaced openings 66 which are of substantially the same diameter as the shanks of screws 58 and which are adapted to cooperate with said screws when the said mica sheet is positioned as shown in Figs. 3 and 4. The upstanding flanges 57 and 57' are bent over and swedged so as to tightly engage the upper surface of top plate 60. The insulating sheet 65 is positioned on the out-struck portion 61 of plate 60 with the threaded shanks of the screws 58 extending through the openings 66 therein. Washers 67 are then placed on the screws 58 and suitable nuts 68 are threaded on the screws and drawn up tight. The two ends of the heating element 21 are thereby gripped between the washers 59 in firm electrical connection with the screws 58 respectively, thus avoiding the possibility of arcs forming at these points which might result in fusing and deterioration of the heating element.

From the foregoing it is obvious that the screws 58, the washers 59, the heating coil 21 and the other elements associated therewith are rigidly secured in the positions and relationship shown in Fig. 4. In the construction described the entire heating unit is encased in a rigid protecting armor through which the threaded ends of the screws 58 extend so as to be adapted for connection with the conductors (not shown) of an electric circuit.

If desired, the armor encasing my improved heating unit may be made substantially integral and water-proof by welding or cold soldering the overturned and swedged flanges 57, 57' to the top plate 60 throughout and by disposing suitable compressible rings of water-proof and heat resisting packing closely about the screws 58 and between the washers 67 and the mica sheet 65.

Various changes and modifications may be made in the methods, apparatus and articles shown and specifically described herein, without departing from the scope and spirit of my invention. For example, any of the class three heating units as herein defined may, if desired, consist of more than two suitable sheets of yieldable insulating material and a plurality of suitable heating elements, with such elements respectively disposed between the sheets of a plurality of pairs of such sheets. All matter herein contained is therefore to be construed as illustrative and not in a limiting sense.

Having thus described my invention, I claim:

1. A heating unit comprising a twisted ribbon heating element and a sheet of insulating material impinged on twisted portions of said element.

2. In a heating unit, a twisted ribbon heating element and a sheet of electrically insulating heat resisting material impinged on said element.

3. In a heating unit, a distorted twisted ribbon heating element having impinging hooks and a sheet of insulating material impinged on said hooks.

4. In a heating unit, a twisted ribbon heating element having warped surfaces and a sheet of insulating material impinged on the twists or convolutions of said element so that the warped surfaces of said element cooperate with said sheet to maintain the element and sheet in fixed relationship.

5. An electric heating unit comprising in final form a yieldable insulating sheet formed of a mixture of materials including magnesium oxide and asbestos, and a conductive heating element embedded in said sheet.

6. An electric heating unit comprising in final form a yieldable insulating sheet formed of a mixture of materials consisting principally of magnesium oxide and asbestos and containing, by weight, not substantially less than one and one-half times as much magnesium oxide as asbestos, and a conductive heating element held in intimate association with said sheet.

7. An electric heating unit comprising in final form a yieldable insulating sheet formed of a mixture of materials consisting principally of magnesium oxide and asbestos and containing, by weight, not substantially more than four times as much magnesium oxide as asbestos, and a conductive heating element held in intimate association with said sheet.

8. An electric heating unit comprising in final form a yieldable insulating sheet formed of a mixture of materials consisting principally of magnesium oxide and asbestos and containing, by weight, not substantially less than one and one-half times as much and not substantially more than four times as much magnesium oxide as asbestos, and a conductive heating element held in intimate association with said sheet.

9. The method of producing a heating unit which consists in placing a preformed sheet of yieldable insulating material contiguous to a heating element, forcing said heating element into said insulating sheet under a comparatively low pressure, then placing a second preformed and yieldable insulating sheet contiguous to said heating element and forcing said preformed insulating sheets into cohering engagement by applying a comparatively high pressure.

10. The method of producing a heating unit which consists in mixing magnesium oxide and asbestos in proportions by weight of not substantially less than one and one-half times as much magnesium oxide as asbestos and with enough water to produce a moldable mixture, forming a sheet from said mixture, then pressing said sheet and drying the same until substantially all of the water is removed therefrom, and then associating said sheet with a heating element and applying sufficient pressure to the associated sheet and element to force such element into fixed and intimate relationship with the sheet.

11. The method of producing a heating unit which consists in positioning a heating element adjacent a hard-surfaced member, then positioning a sheet of insulating material over and adjacent said element, and then forcing said sheet and element towards said member with sufficient pressure to distort such element against the surface of said member and to impress the element into the sheet.

12. The method of producing a heating unit which consists in disposing a perforated sheet of yieldable insulating material on a hard and substantially plane surfaced member provided with depressible projecting pins so that each of said pins extends through one of said perforations and projects above the sheet, disposing a twisted ribbon heating element around and between the projecting portions of said pins in a predetermined pattern, then disposing a second sheet of yieldable insulating material on said depressible pins and adjacent and over said heating element, and then applying a force to depress said pins and to compress said sheets and heating element against said member and into a unitary structure with the sheets and heating element in fixed and intimate relationship.

13. A heating unit comprising a pair of yieldable sheets in fixed and intimate relationship, and a twisted ribbon heating element disposed between said sheets, said sheets and element coacting to maintain said sheets in such relationship.

14. A heating unit comprising a sheet of electrical insulating material and a heating element, said element being distorted to form a projecting portion embedded in said sheet for maintaining said sheet and element in fixed relationship.

15. A heating unit comprising a sheet of electrical insulating material and a heating element, said heating element being distorted to form at least one impinging hook engaging said sheet to maintain the said sheet and element in fixed relationship.

THOMAS A. EDISON, Jr.